United States Patent
Lee et al.

(10) Patent No.: US 8,848,117 B2
(45) Date of Patent: Sep. 30, 2014

(54) DISPLAY APPARATUS

(75) Inventors: Gak Seok Lee, Cheonan-si (KR); Jaehyoung Park, Suwon-si (KR); Kichul Shin, Asan-si (KR); Youn Hak Jeong, Cheonan-si (KR); Tae Kwon Jung, Seongnam-si (KR); Haksun Chang, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 147 days.

(21) Appl. No.: 13/470,037

(22) Filed: May 11, 2012

(65) Prior Publication Data
US 2013/0141653 A1    Jun. 6, 2013

(30) Foreign Application Priority Data
Dec. 1, 2011 (KR) .................. 10-2011-0127923

(51) Int. Cl.
*G02F 1/1335* (2006.01)

(52) U.S. Cl.
USPC ........................................... 349/15

(58) Field of Classification Search
CPC ................................. G02B 27/2214
USPC ........................................... 349/15
See application file for complete search history.

(56) References Cited

U.S. PATENT DOCUMENTS

| | | | | |
|---|---|---|---|---|
| 3,857,629 A | * | 12/1974 | Freiser | 349/170 |
| 6,128,059 A | * | 10/2000 | Nishiguchi | 349/129 |
| 6,222,672 B1 | * | 4/2001 | Towler et al. | 359/465 |
| 6,348,957 B1 | * | 2/2002 | Yamazaki et al. | 349/15 |
| 6,570,629 B1 | * | 5/2003 | Hirakata et al. | 349/15 |
| 6,714,174 B2 | * | 3/2004 | Suyama et al. | 345/32 |
| 6,734,923 B2 | * | 5/2004 | Kwon et al. | 349/15 |
| 7,215,475 B2 | * | 5/2007 | Woodgate et al. | 359/624 |
| 8,394,467 B2 | * | 3/2013 | Arai et al. | 428/1.1 |
| 2010/0026795 A1 | * | 2/2010 | Moller et al. | 348/56 |
| 2012/0281273 A1 | * | 11/2012 | Shinkai et al. | 359/315 |

OTHER PUBLICATIONS

Brimicombe, et al, "Modeling of Dual Frequency Liquid Crystal Materials and Devices", Journal of Applied Physics, Nov. 21, 2005, pp. 104104-1 to 104104-6, vol. 98, American Institute of Physics.

* cited by examiner

*Primary Examiner* — James Dudek
(74) *Attorney, Agent, or Firm* — H.C. Park & Associates, PLC

(57) ABSTRACT

A display apparatus includes a shutter panel and a display panel that alternately displays a left-eye image and a right-eye image in a 3D mode. The shutter panel includes dual-frequency liquid crystals in which a polarity of dielectric constant anisotropy is changed according to a frequency of the driving voltage to selectively delay a phase of the left-eye image or the right-eye image, which pass through the dual-frequency liquid crystals. The dual-frequency liquid crystals have a fast response speed to the low voltage, and thus a cross-talk phenomenon between the left-eye image and the right-eye image may be prevented.

17 Claims, 13 Drawing Sheets

DISPLAY APPARATUS

CROSS REFERENCE TO RELATED APPLICATION

This application claims priority from and the benefit of Korean Patent Application No. 10-2011-0127923, filed on Dec. 1, 2011, which is hereby incorporated by reference for all purposes as if fully set forth herein.

BACKGROUND OF THE INVENTION

1. Field of the Invention

Exemplary embodiments of the present invention relate to a display apparatus capable of displaying a three-dimensional (3D) image.

2. Description of the Background

In general, methods of displaying a stereoscopic image on a display apparatus may be classified as glass-type methods and glassless-type methods. The glass-type method is involves changing a polarization direction of a left-eye image and a right-eye image using a retarder, or displaying the left-eye image and the right-eye image at alternating time intervals, to thereby provide a three-dimensional (3D) image to a viewer.

However, conventional 3D display apparatuses may suffer from cross-talk (e.g., image ghosting) and high power consumption. Cross-talk may occur when right-eye images are seen by a viewer's left eye (and vice-versa) resulting in image overlaps and a poor 3D viewing experience.

SUMMARY OF THE INVENTION

Exemplary embodiments of the present invention provide a display apparatus capable of preventing a cross-talk phenomenon and reducing power consumption.

Additional features of the exemplary embodiments of the invention will be set forth in the description which follows, and in part will be apparent from the description, or may be learned by practice of the invention.

Exemplary embodiments of the present invention disclose a display system including a shutter panel and a display panel. The shutter panel includes dual-frequency liquid crystals. The display panel displays, alternately, a left-eye image and a right-eye image in a 3D mode. The left-eye image and the right-eye image pass through the dual-frequency liquid crystals. A polarity of dielectric constant anisotropy of the liquid crystals is changed according to a frequency of the driving voltage to selectively delay a phase of the left-eye image or a phase of the right-eye image.

Exemplary embodiments of the present invention disclose a display apparatus including a display panel and a shutter panel. The display panel outputs a first image and a is second image. The shutter panel is coupled to the display panel and includes a first electrode, a second electrode parallel to the first electrode, and a liquid crystal layer. The liquid crystal layer is disposed between the first electrode and the second electrode and includes dual-frequency liquid crystals. In response to a high frequency voltage being applied to the first electrode and the second electrode, the dual-frequency liquid crystals align in a first direction relative to the first electrode, and the first image is phase delayed. In response to a low frequency voltage being applied to the first electrode and the second electrode, the dual-frequency liquid crystals align in a second direction relative to the first electrode, and the first image is not phase delayed. The second direction is perpendicular to the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
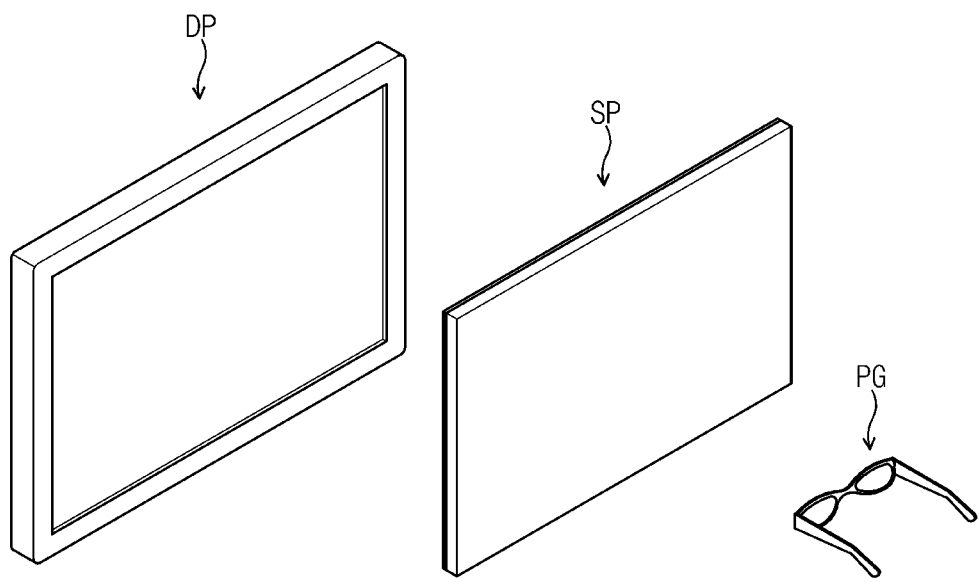
FIG. 1 is a perspective view showing a display apparatus according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Referring to FIG. 1, the display apparatus may include a display panel DP that displays an image and a shutter panel SP.

The display panel DP may operate in a three-dimensional (3D) mode or a two-dimensional (2D) mode in response to a signal generated by and corresponding to a user's (e.g., viewer's) selection. The display panel DP may display a 2D image in the 2D mode and a 3D image in the 3D mode. The user may view the 3D image through a left window and a right window of polarizing glasses PG.

The display panel DP may be any suitable display panel including, but not limited to, a liquid crystal display panel, an organic light emitting display panel, an electrophoretic display panel, and an electro-wetting display panel.

In cases where the display panel DP is a liquid crystal display panel, the liquid crystal display panel PD may include two substrates and a liquid crystal layer disposed between the two substrates. The display apparatus may further include a backlight unit to provide a light BL (refer to FIG. 4A and FIG. 4B) to the liquid crystal display panel. In addition, the display apparatus may include polarizing plates PF1 and PF2 (refer to FIG. 4A and FIG. 4B) to polarize any 2D images and any 3D images. The liquid crystal display panel DP may be provided between the pair of polarizing plates PF1 and PF2. Except for the liquid crystal display panel, other display panels may include only one polarizing plate between the display panel DP and the shutter panel SP.

Figure 2:
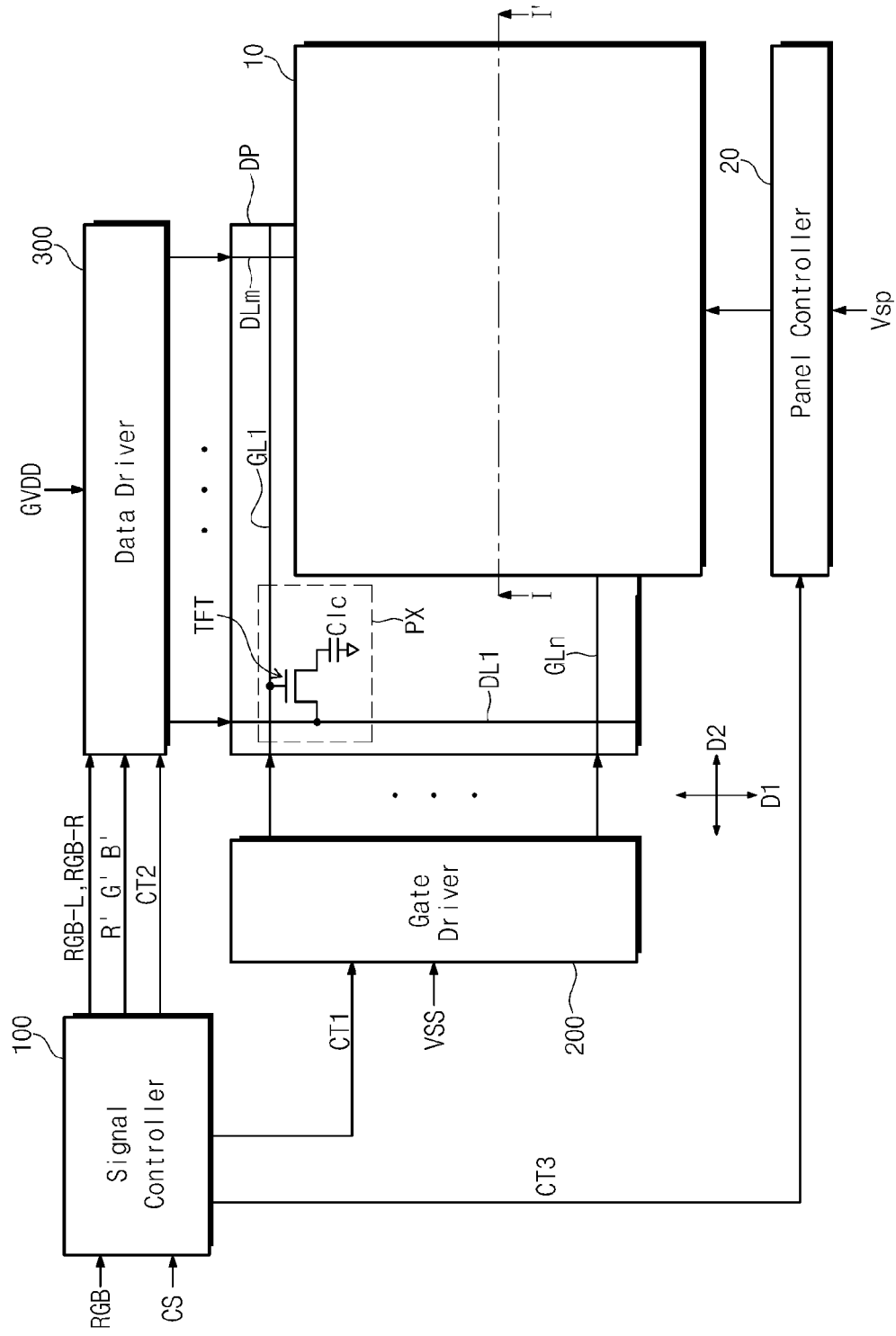
FIG. 2 is a block diagram of the display apparatus in FIG. 1, according to exemplary embodiments of the present invention.

As shown in FIG. 2, the display panel DP may include a plurality of pixels PX. Each of the pixels PX may include a liquid crystal capacitor Clc and a thin film transistor TFT to switch a voltage applied to the liquid crystal capacitor Clc.

The display panel DP may include a plurality of gate lines GL1 to GLn and a plurality of data lines DL1 to DLm (where n and m are whole numbers greater than 0). The gate lines GL1 to GLn may be disposed on one of the two substrates, may extend in a row direction D2, and may be arranged in a column direction D1. The data lines DL1 to DLm may extend in the column direction D1 and may be arranged in the row direction D2. In addition, the data lines DL1 to DLm are insulated from the gate lines GL1 to GLn while crossing the gate lines GL1 to GLn.

The thin film transistor TFT may be disposed on the one substrate of the two substrates and may be connected to a corresponding one of the gate lines GL1 to GLn and a corresponding one of the data lines DL1 to DLm.

The liquid crystal capacitor Clc may include a first electrode, a second electrode facing the first electrode, and a dielectric layer interposed between the first electrode and the second electrode. The first electrode may be a pixel electrode connected to the thin film transistor TFT, the second electrode may be a common electrode disposed on a remaining one of the two substrates, and the dielectric layer may be the liquid crystal layer. Although not shown in FIG. 2 and FIG. 3, each of the pixels PX may further include a storage capacitor, and the common electrode may be disposed on the one substrate of the two substrates.

The display apparatus may include a signal controller 100, a gate driver 200, and a data driver 300 to drive the display panel DP.

The signal controller 100 may control the gate driver 200 and the data driver 300 in the 2D mode in response to a 2D mode selection control signal provided through a user (e.g., viewer) interface or a 2D identification code extracted from an input image signal RGB. In addition, the signal controller 100 may control the gate driver 200 and the data driver 300 in the 3D mode in response to a 3D mode selection control signal provided through the user interface or a 3D identification code extracted from the input image signal RGB.

In the 2D mode, the signal controller 100 may convert the input image signal RGB into image data R'G'B' appropriate to an operation condition of the display panel DP and outputs the image data R'G'B'. The signal controller 100 may receive various control signals CS, such as a vertical synchronizing signal, a horizontal synchronizing signal, a main clock, and a data enable signal to output first, second, and third control signals CT1, CT2, and CT3.

The first control signal CT1 may be used to control an operation of the gate driver 200. The first control signal CT1 may include a vertical start signal starting the operation of the gate driver 200, a gate clock signal determining an output timing of a gate voltage, and an output enable signal determining an on-pulse width of the gate voltage. In addition, the first control signal CT1 may include a 2D synchronizing signal.

The second control signal CT2 may be used to control an operation of the data driver 300. The second control signal CT2 may include a horizontal start signal starting the operation of the data driver 300, an inversion signal inverting a polarity of a data voltage, and an output indicating signal that determines an output timing of the data voltage from the data driver 300.

The third control signal CT3 may be a 2D synchronizing signal in order to synchronize the shutter panel SP with the display panel DP.

The gate driver 200 may receive the first control signal CT1 and a gate driving voltage VSS. The gate driver 200 may output a gate voltage to the gate lines GL1 to GLn in response to the first control signal CT1. The gate voltage may sequentially be applied to the gate lines GL1 to GLn during one frame period Ft. The gate voltage may be the same as or a proportion of the gate driving voltage VSS.

The data driver 300 may receive the image data R'G'B from the signal controller 100. In addition, the data driver 300 may receive a gamma reference voltage GVDD to convert the image data R'G'B into the data voltage. Accordingly, the display panel DP may display a 2D image during each frame period. The 2D image may be provided to left and right eyes of a viewer without the viewer noticing any difference in images between the left and right eyes.

In the 3D mode, the signal controller 100 may convert the input image signal RGB into a left-eye image data RGB-L and a right-eye image data RGB-R. The signal controller 100 may provide the left-eye image data RGB-L, the right-eye image data RGB-R, and the second control signal CT2 including a 3D synchronizing signal to the data driver 300.

In addition, the signal controller 100 may apply the first control signal CT1, including the 3D synchronizing signal, to the gate driver 200 and the third control signal CT3, including the 3D synchronizing signal, to a panel controller 20 of the shutter panel SP.

The gate driver 200 may output the gate voltage in response to the first control signal CT1. The gate driver 200 may sequentially apply the gate voltage(s) to the gate lines GL1 to GLn. The gate driver 200 may output gate voltage two times within one frame period.

The data driver 300 may convert the left-eye image data RGB-L into data voltage to apply the data voltage to the data lines DL1 to DLm, and may convert the right-eye image data into data voltage to apply the data voltage to the data lines DL1 to DLm.

Figure 3:
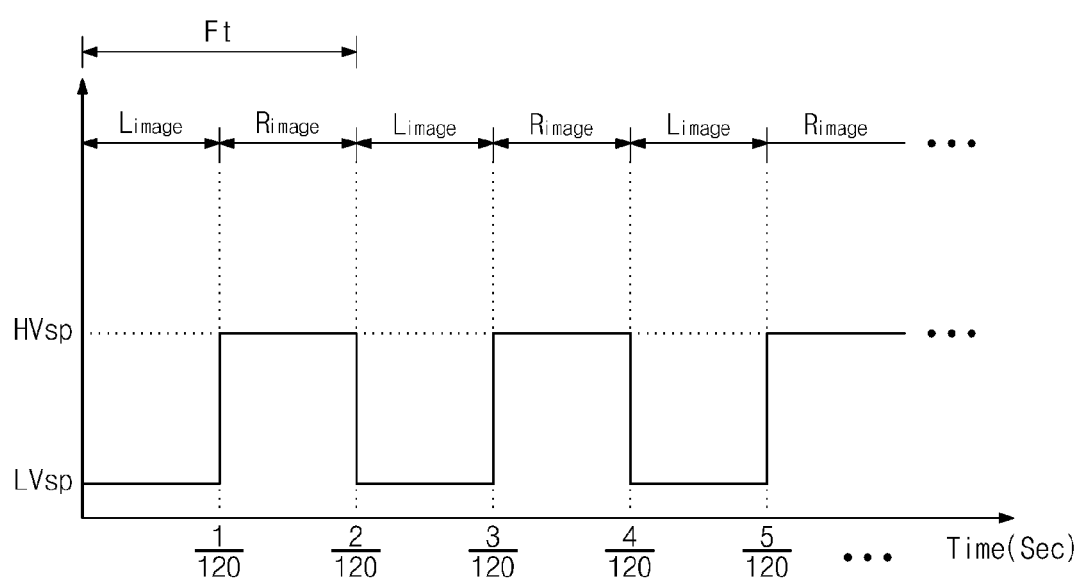
FIG. 3 is a timing diagram showing a left-eye image and a right-eye image is displayed on the display panel shown in FIG. 1, according to exemplary embodiments of the present invention.

As shown in FIG. 3, the display panel DP may alternately display the left-eye image Limage and the right-eye image Rimage in the 3D mode during one frame period Ft. For instance, the display panel DP may display the left-eye image Limage corresponding to one half frame during 1/120 seconds, and may display the right-eye image Rimage corresponding a second half frame during 1/120 seconds. Thus, the display panel DP displays the 3D image corresponding to one frame Ft during 1/60 seconds.

The left-eye image Limage and the right-eye image Rimage, which are displayed on the display panel DP, are polarized by the polarizing plates included in the display apparatus.

Hereinafter, the directivity of the left-eye image Limage and the right-eye image Rimage will be described with reference to FIG. 4A and FIG. 4B.

Figure 4A:
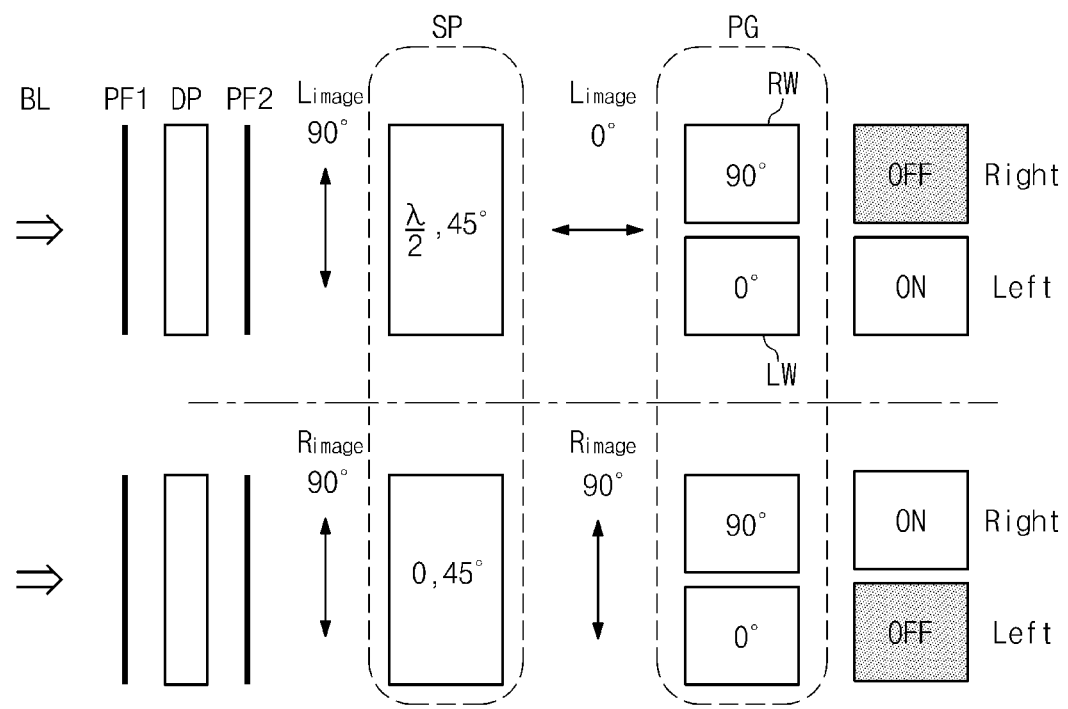
FIG. 4A and FIG. 4B are views showing polarization directions of left-eye images and right-eye images displayed on the display panel shown in FIG. 1, according to exemplary embodiments of the present invention.

Referring to FIG. 4A, the display panel DP may generate the left-eye image Limage and the right-eye image Rimage using the light BL provided from the backlight unit. The light BL generated by the backlight unit may be polarized in a first direction while passing through the first polarizing plate PF1. A transmission axis of the first polarizing plate PF1 may be used as a reference axis. The display apparatus may generate the left-eye image Limage using the light passing through the first polarizing plate PF1.

The left-eye image Limage generated by the display apparatus may be polarized in a second direction while passing through the second polarizing plate PF2. The transmission axis of the first polarizing plate PF1 may be substantially perpendicular to a transmission axis of the second polarizing plate PF2. Accordingly, the left-eye image Limage passing through the second polarizing plate PF2 may be polarized about 90 degrees with respect to the transmission axis of the first polarizing plate PF1. Generally, the display panel is operated in a normally black mode; however, the display panel DP may operate in a normally white mode when the transmission axis of the first polarizing plate PF1 is substantially parallel to the transmission axis of the second polarizing plate PF2.

The polarizing direction of the left-eye image Limage is changed when passing through the shutter panel SP. For example, when the left-eye image Limage passes through the liquid crystal layer 15 (refer to FIG. 5) included in the shutter panel SP, the left-eye image Limage may have a phase change. The shutter panel SP may operate in two modes. During a first mode in which the left-eye image Limage passes through the shutter panel SP, the liquid crystal layer 15 may provide a phase delay of about $\lambda/2$ on the left-eye image Limage ($\lambda$ is a wavelength). An angle between the transmission axis of the first polarizing plate PF1 and a slow axis of the shutter panel SP may be about 45 degrees.

Accordingly, the left-eye image Limage passing through the shutter panel SP may be phase shifted by a delay of about 90 degrees, and thus the polarizing direction of the left-eye image Limage is changed to about zero degrees.

The left-eye image Limage polarized at about zero degrees passes through the left window LW of the polarizing glasses PG and does not pass through the right window RW of the polarizing glasses PG. Thus, only the left eye of the viewer perceives the left-eye image Limage. The left window LW and the right window RW of the polarizing glasses PG may have transmission axes different from each other. For example, the transmission axis of the left window LW may be 90 degrees different than the transmission axis of the right window RW. The transmission axis of the left window LW is substantially parallel to the transmission axis of the first polarizing plate PF1 included in the display panel DP, and the transmission axis of the right window RW is substantially perpendicular to the transmission axis of the first polarizing plate PF1 included in the display panel DP.

As shown in FIG. 4A, the right-eye image Rimage, which passes through the second polarizing plate PF2 included in the display panel DP, may be polarized in the second direction. Although the right-eye image Rimage passes through the shutter panel SP, the polarizing direction of the right-eye image Rimage is not changed. When the right-eye image Rimage passes through the liquid crystal layer 15, the shutter panel SP is operated in a second mode. In the second, the liquid crystal layer 15 does not provide a phase delay to an image.

Accordingly, the right-eye image Rimage passing through the shutter panel SP may maintain the polarizing direction of about 90 degrees. The right-eye image Rimage is polarized at about 90 degrees passes through the right window RW of the polarizing glasses PG and does not pass through the left window LW of the polarizing glasses PG. Consequently, only the right eye of the viewer may perceive the right-eye image Rimage.

Figure 4B:
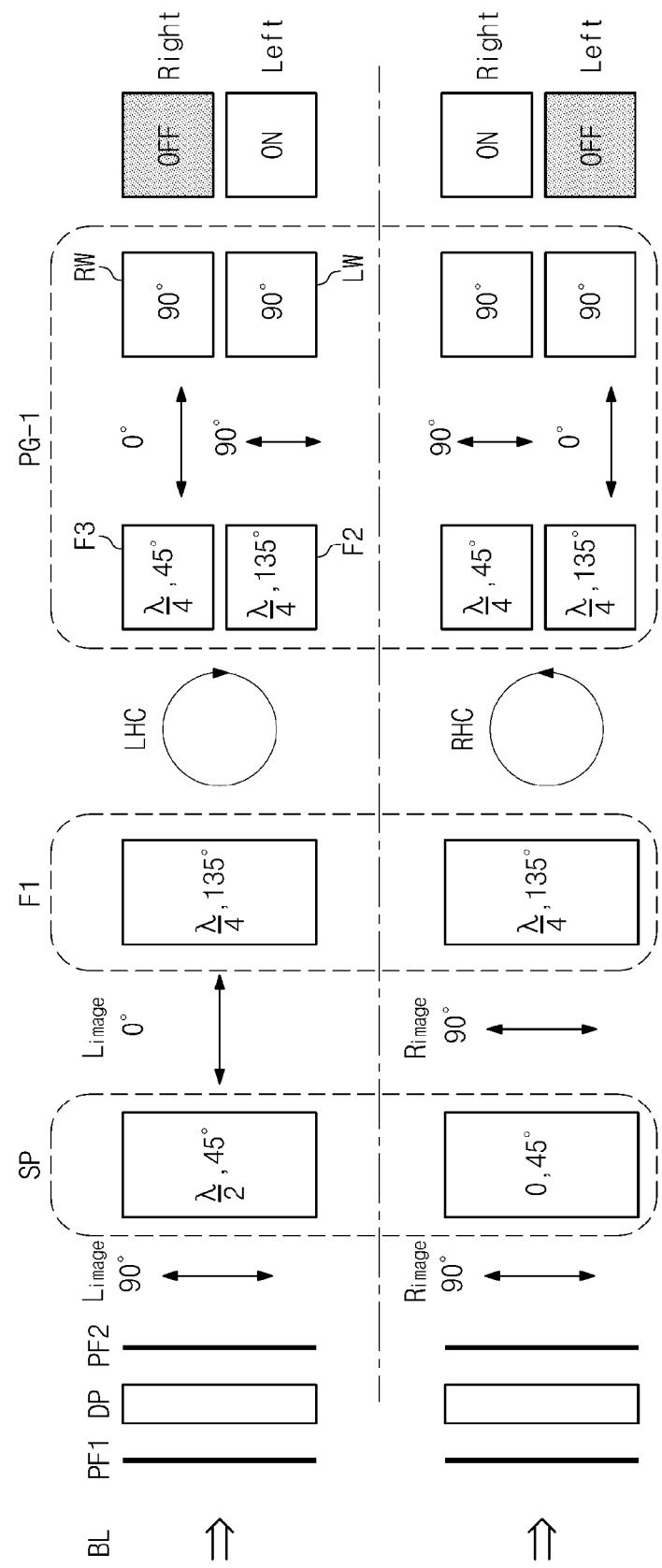

Referring to FIG. 4B, the display apparatus may further include a first λ/4 phase delay plate F1. The left-eye image Limage may still be provided to only the left eye of the viewer, and the right-eye image Rimage may be provided to only the right eye of the viewer. In such cases, the left window LW and the right window RW may have the same transmission axis. Each of the left window LW and the right window RW may have a transmission axis substantially parallel to the transmission axis of the first polarizing plate PF1 included in the display panel DP.

In the first mode, the left-eye image Limage passing through the shutter panel SP may be polarized in a direction of about zero degrees. The left-eye image Limage polarized in the direction of about zero degrees may pass through the first λ/4 phase delay plate F1 and may be polarized in a left-hand circular direction. The first λ/4 phase delay plate F1 may have a slow axis rotated at about 90 degrees with respect to the slow axis of the shutter panel SP.

Each of the left window LW and the right window RW may further include a second λ/4 phase delay plate F2 and a third λ/4 phase delay plate F3, respectively. The second λ/4 phase delay plate F2 may have the same slow axis as the first λ/4 phase delay plate F1, and the third λ/4 phase delay plate F3 may have a different slow axis from the first λ/4 phase delay plate F1. The third λ/4 phase delay plate F3 may have a slow axis rotated at about 90 degrees with respect to the slow axis of first λ/4 phase delay plate F1.

The left-eye image Limage polarized in the left-hand circular direction may be polarized in the direction of about 90 degrees after passing through the second λ/4 phase delay is plate F2 and may be provided to the left eye of the viewer. However, the left-eye image Limage polarized in the left-hand circular direction may be polarized in the direction of about 0 degrees after passing through the third λ/4 phase delay plate F3. Accordingly, the left-eye image Limage is not provided to the right eye of the viewer.

In the second mode, the polarizing direction of the right-eye image Rimage passing through the shutter panel SP may not change. The right-eye image Rimage polarized in the direction of about 90 degrees may be polarized in a right-hand circular direction while passing through the first λ/4 phase delay plate F1.

The right-eye image Rimage polarized in the right-hand circular direction may be polarized in the direction of about 0 degrees after passing through the second λ/4 phase delay plate F2, so the right-eye image Rimage is not provided to the left eye of the viewer. However, the right-eye image Rimage polarized in the right-hand circular direction may be polarized in the direction of about 90 degrees after passing through the third λ/4 phase delay plate F3, and thus the right-eye image Rimage is provided to the right eye of the viewer.

Figure 5:
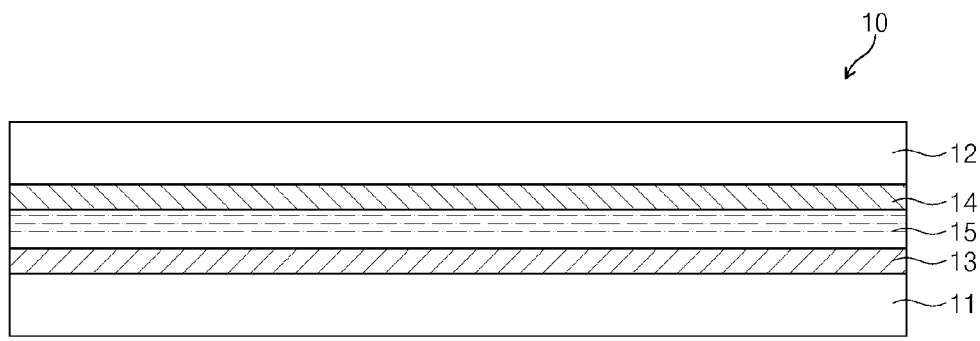
FIG. 5 is a cross-sectional view taken along line I-I' in FIG. 2 to show a panel part of the shutter panel in FIG. 1, according to exemplary embodiments of the present invention.
Figure 6:
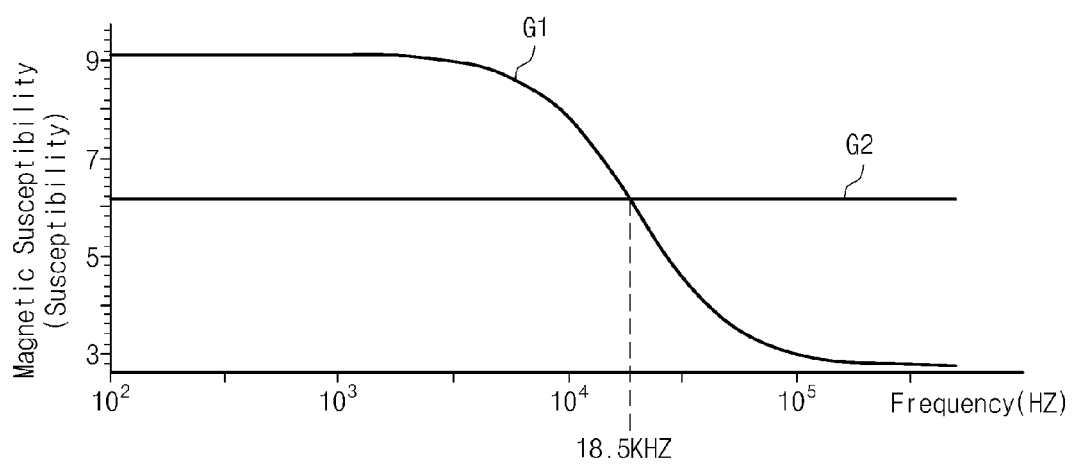
FIG. 6 is a graph showing a magnetic susceptibility of liquid crystal molecules according to frequency variation of a driving voltage, according to exemplary embodiments of the present invention.
Figure 7:
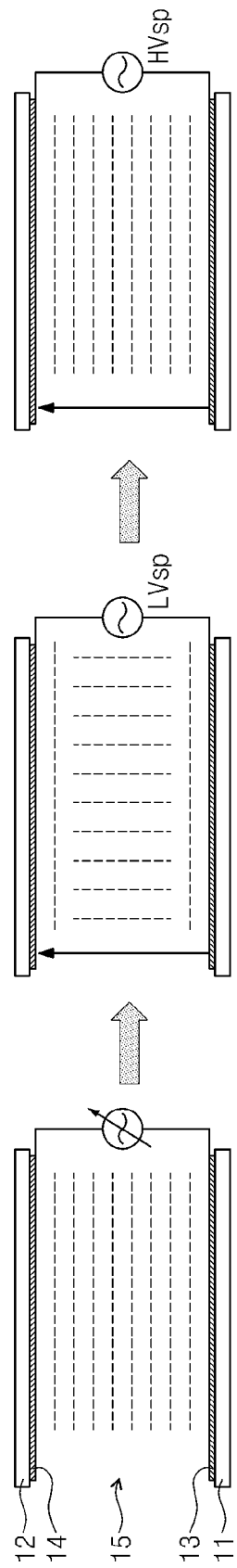
FIG. 7 is a view showing an arrangement of liquid crystal molecules according to a frequency of a driving voltage, according to exemplary embodiments of the present invention.

Referring to FIG. 5, FIG. 6, and FIG. 7, the shutter panel SP may include a panel part 10 and a panel controller 20.

As shown in FIG. 5, the panel part 10 may include a first substrate 11, a second substrate 12 facing the first substrate 11, a first electrode 13 disposed on a surface of the first substrate 11, and a second electrode 14 disposed on a surface of the second substrate 12. In addition, the panel part 10 may include a liquid crystal layer 15 disposed between the first substrate 11 and the second substrate 12.

The first and second substrates 11 and 12 may be formed of a transparent member, and the first and second electrodes 13 and 14 may be formed of a transparent conductive material. Various suitable types of transparent members and transparent conductive materials may be used for the first and second substrates 11 and 12 and the first and second electrodes 13 and 14, respectively.

The liquid crystal layer 15 may include dual-frequency liquid crystals in which a polarity of dielectric constant anisotropy is changed according to a frequency of the driving voltage. For instance, the liquid crystals included in the liquid crystal layer 15 may have a dielectric constant anisotropy ($\Delta \in$) of about +3.3 at about 1 kHz and about −2.7 at about 100 kHz. The dielectric constant anisotropy ($\Delta \in$) satisfies the following equation:

Equation $$\Delta \in = \in_{\parallel} - \in_{\perp}$$

In the equation, $\in_{\parallel}$ denotes a dielectric constant parallel to a director of the liquid crystals (e.g., a long axis direction of liquid crystal) and $\in_{\perp}$ denotes a dielectric constant perpendicular to the director of the liquid crystals. Consequently, a relative value between $\in_{\parallel}$ and $\in_{\perp}$ is changed according to the frequency of the driving voltage applied to the liquid crystals included in the liquid crystal layer 15.

Accordingly, the arrangement of the liquid crystals is changed according to the frequency of the driving voltage applied to the first electrode 13 and the second electrode 14. In FIG. 5, each of the first electrode 13 and the second electrode 14 may be formed in a single body, but the first and second electrodes 13 and 14 are not limited to the single body. For example, in some cases, at least one of the first electrode 13 or the second electrode 14 may be formed in plural portions spaced apart from each other in a unit of sub-pixel.

In FIG. 6, a first graph G1 representing a horizontal magnetic susceptibility of the is liquid crystals and a second graph G2 representing a vertical magnetic susceptibility of the liquid crystals are shown.

The horizontal magnetic susceptibility is a property in which the director of the liquid crystals is arranged in the direction parallel to a direction of an electric field, and the vertical magnetic susceptibility is a property in which the director of the liquid crystals is arranged in the direction vertical (i.e., perpendicular) to the direction of the electric field. A frequency, in which the horizontal magnetic susceptibility is equal to the vertical magnetic susceptibility, is called a reference frequency.

As shown in FIG. 6, since the horizontal magnetic susceptibility represented by the first graph G1 and the vertical magnetic susceptibility represented by the second graph G2 are the same at the frequency of about 18.5 kHz, the reference frequency may be about 18.5 kHz. A frequency, which is lower than the reference frequency, may be referred to as a low frequency, and a frequency, which is higher than the reference frequency, may be referred to as a high frequency.

A low frequency driving voltage LVsp does not cause a rotation of the liquid crystals to the short axis of the liquid crystals, and a high frequency driving voltage HVsp causes the rotation of the liquid crystals to the short axis of the liquid crystals.

As shown in FIG. 7, when the low frequency driving voltage LVsp is applied to the first electrode 13 and the second electrode 14, the director of the liquid crystals may be arranged vertical to the first electrode 13 and the second electrode 14. When the high frequency driving voltage HVsp is applied to the first electrode 13 and the second electrode 14, the director of the liquid crystals may be arranged parallel to the first electrode 13 and the second electrode 14.

Accordingly, the panel part 10 may operate in the second mode when the low frequency driving voltage LVsp is applied to the first electrode 13 and the second electrode 14, and the panel part 10 may operate in the first mode when the high frequency driving voltage HVsp is applied to the first electrode 13 and the second electrode 14. The director of the liquid crystals may be arranged, in some cases, to be parallel (as shown in FIG. 7), and, in some cases, to be perpendicular to the first electrode 13 and the second electrode 14 when no driving voltage is applied.

When the director of the liquid crystals is arranged vertical to the first electrode 13 and the second electrode 14, no phase delay occurs in the image passing through the liquid crystal layer 15. However, when the director of the liquid crystals is arranged parallel to the first electrode 13 and the second electrode 14, the phase delay may occur in the image passing through the liquid crystal layer 15.

When the liquid crystals are switched by applying the low frequency driving voltage LVsp and the high frequency driving voltage HVsp to the first electrode 13 and the second electrode 14, a response speed of the shutter panel SP may be fast.

Hereinafter, the response speed of the shutter panel SP will be described in detail with reference to FIG. 8A and FIG. 8B.

Figure 8A:
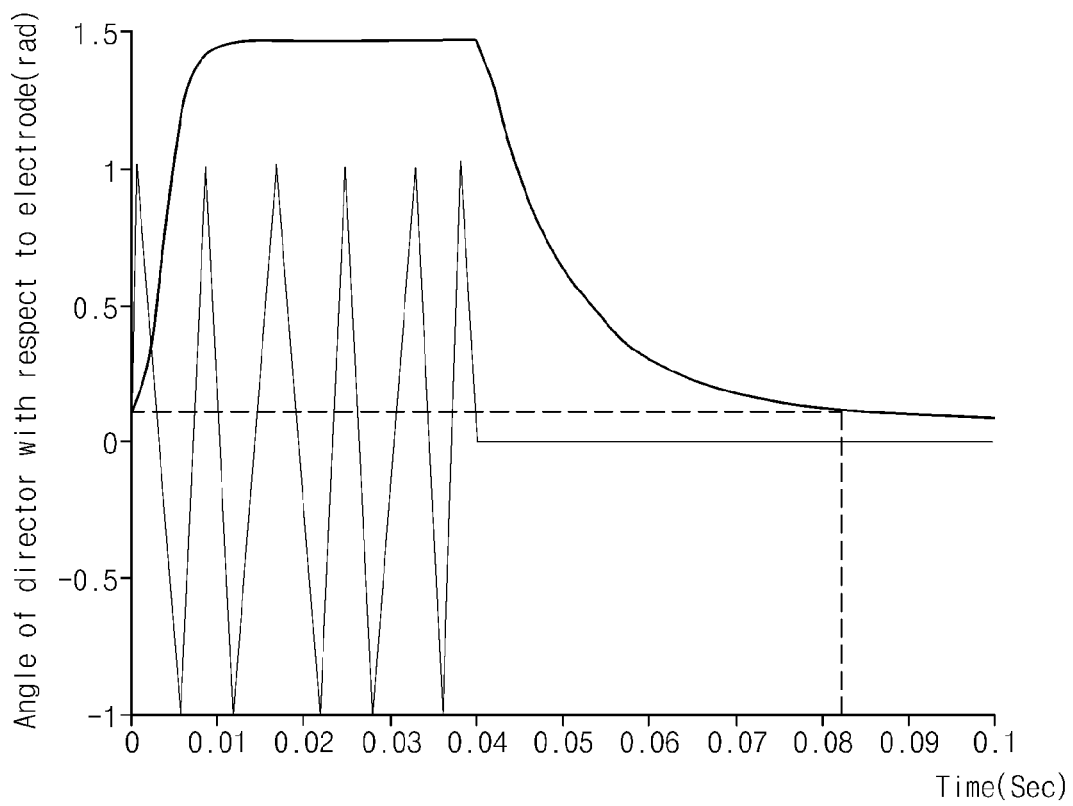
FIG. 8A and FIG. 8B are graphs showing an arrangement of liquid crystal molecules, which is varied according to a driving voltage, according to exemplary embodiments of the present invention.
Figure 8B:
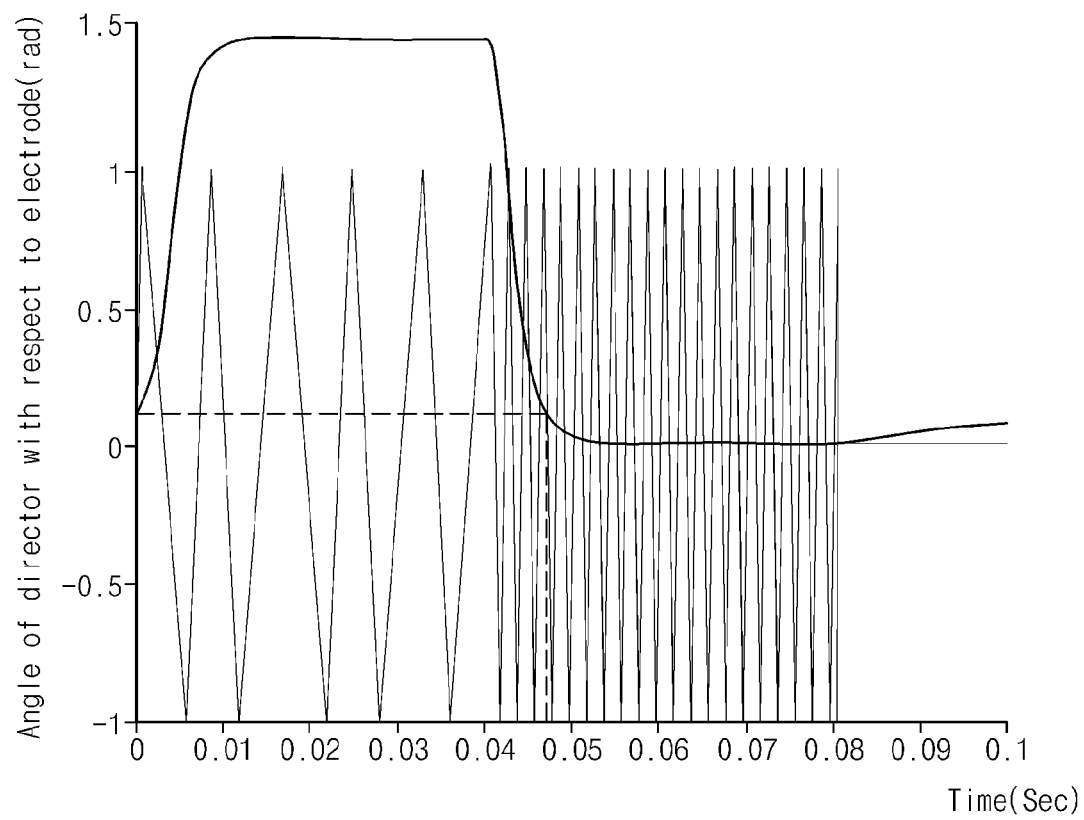

FIG. 8A and FIG. 8B are graphs showing an arrangement of liquid crystal molecules, which is varied according to a driving voltage.

When the low frequency driving voltage LVsp is applied to the first electrode 13 and the second electrode 14, the director of the liquid crystals may be arranged vertical to the first electrode 13 and the second electrode 14. For instance, when the low frequency driving voltage LVsp at about 5 volts and about 500 Hz is applied to the first and second electrodes 13 and 14 and a cell gap is about 3 micrometers, it takes about 0.04 seconds until the director of the liquid crystals is arranged vertical to the first electrode 13 and the second electrode 14 as shown in FIG. 8A. The cell gap is a distance between the first electrode 13 and the second electrode 14. Then, when the high frequency driving voltage HVsp is not applied to the first electrode 13 and the second electrode 14, it takes about 0.04 seconds until the director of the liquid crystals is arranged parallel to the first electrode 13 and the second electrode 14.

In contrast, as shown in FIG. 8B, when the high frequency driving voltage HVsp at about 5 volts and about 50 kHz is applied to the first electrode 13 and the second electrode 14, it takes about 0.01 seconds until the director of the liquid crystals is arranged parallel to the first electrode 13 and the second electrode 14.

As described above, although the display panel DP displays the right-eye image Rimage after displaying the left-eye image Limage, a cross-talk phenomenon may be reduced since the operation mode of the panel part 10 may be rapidly changed from the first mode to the second mode.

Further, since the dual-frequency liquid crystals have a fast response speed to a low voltage (e.g., 5V), power consumption of the display apparatus may be reduced compared with a conventional display apparatus. As shown in table below, the shutter panel SP described with reference to FIG. 5 to FIG. 8B has an off-time similar to or shorter than that of other shutter panels. The off-time shown in Table 1 has been measured in the shutter panel SP when the driving voltage is not applied and the director of the liquid crystals is arranged vertical to the first and second electrodes 13 and 14.

TABLE 1

| | ON-TIME (ms) | OFF-TIME (ms) | Driving voltage (volts) |
| --- | --- | --- | --- |
| OCB (Optically Compensated Birefringence) mode shutter panel | 0.4 | 1.25 | 19 |
| TN (Twisted Nematic) mode shutter panel | 1 | 2 | 19 |
| Shutter panel included in the display apparatus according to exemplary embodiments of the invention | 2.2 | 1.3 | 8 |
| Shutter panel included in the display apparatus according to exemplary embodiments of the invention | 0.67 | 0.84 | 15 |

The off-time refers to the time period needed for the director of the liquid crystals, which is arranged parallel to the electrodes, to be arranged vertical to the electrodes. The off-time has been measured in a shutter panel SP having a cell gap of about 2.4 micrometers. The off-time of the shutter panel SP may be measured under the condition that the low frequency driving voltage LVsp has a frequency of about 1 kHz and the high frequency driving voltage HVsp has a frequency of about 50 kHz. As shown in Table 1, the off-time of the shutter panel SP may be shorter than the off-time of the other shutter panels at substantially the same voltage. The on-time refers to the time period needed for the director of the liquid crystals, which is arranged vertical to the electrodes, to be arranged parallel to the electrodes. The shutter panel SP may transmit light or the image during the on-time and may block light or the image during the off-time.

Figure 9:
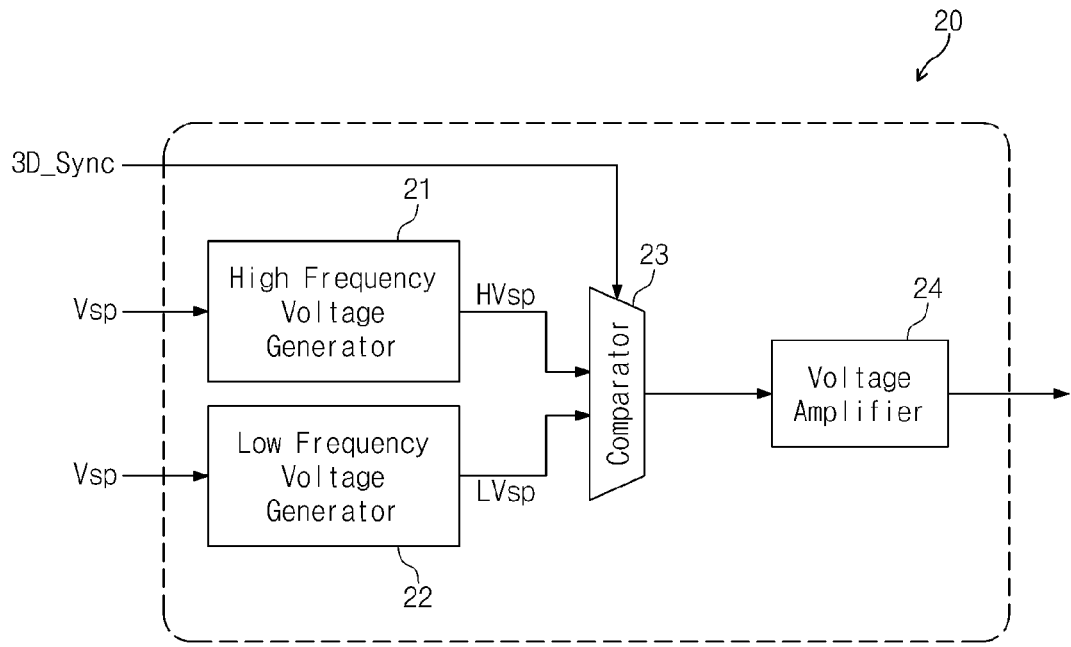
FIG. 9 is a block diagram showing a panel controller of the shutter panel shown in FIG. 1, according to exemplary embodiments of the present invention.
Figure 10:
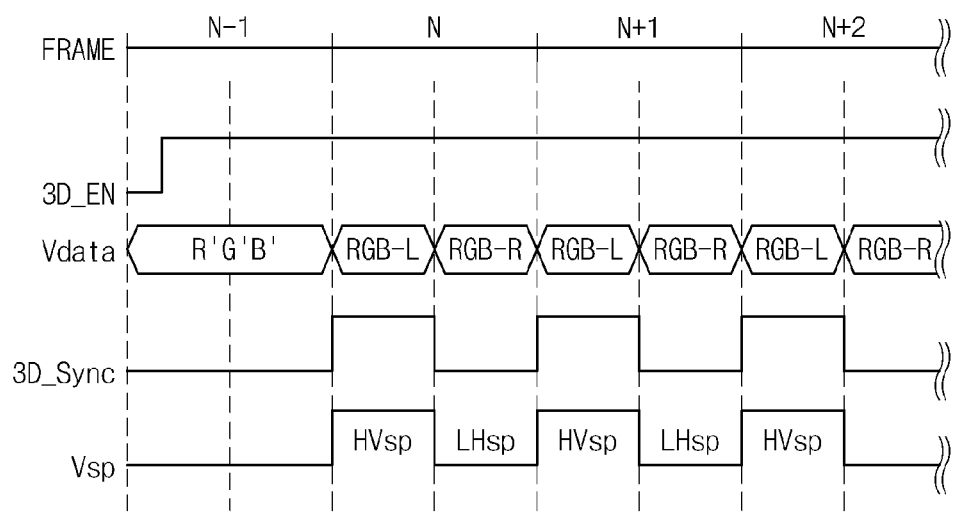
FIG. 10 is a waveform diagram showing a driving method of the shutter panel shown in FIG. 9, according to exemplary embodiments of the present invention.

Hereinafter, a method of driving the panel part 10 using the panel controller 20 will be described in detail with reference to FIG. 9 and FIG. 10. FIG. 9 is a block diagram showing a panel controller 20 of the shutter panel SP shown in FIG. 1. FIG. 10 is a waveform diagram showing a driving method of the shutter panel SP shown in FIG. 9.

Referring to FIG. 9, the panel controller 20 may include a high frequency voltage generator 21 and a low frequency voltage generator 22. The high frequency voltage generator 21 may modify the driving voltage Vsp to provide the high frequency driving voltage HVsp, and the low frequency voltage generator 22 may modify the driving voltage to provide the low frequency driving voltage LVsp. In addition, the panel controller 20 further includes a comparator 23. The comparator 23 may output either the high frequency driving voltage HVsp or the low frequency driving voltage LVsp in response to the 3D synchronizing signal 3D_sync.

Referring to FIG. 10, when a 3D enable signal 3D_EN is transited to a high level in an (N−1)th frame period, the signal controller 100 may provide the left-eye image data RGB-L and the right-eye image data RGB-R to the data driver 300. During an N-th frame period, the display panel DP may display the left-eye image Limage based on the left-eye image data RGB-L, and may then display the right-eye image Rimage based on the right-eye image data RGB-R. The display panel DP may alternately display the left-eye image Limage and the right-eye image Rimage after the N-th frame period. The display panel DP may display the left-eye image Limage when the 3D synchronizing signal 3D_sync is in the high level and may display the right-eye image Rimage when the 3D synchronizing signal 3D_sync is in the low level. In some cases, the display panel DP may display a black image between the left-eye image Limage and the right-eye image Rimage so as to prevent an afterimage from occurring. In some cases, the display panel DP may alternately display the left-eye and right-eye images Limage and Rimage without displaying the black image.

In addition, the comparator 23 selectively outputs the high frequency driving voltage HVsp and the low frequency driving voltage LVsp based on the level of the 3D synchronizing signal 3D_sync. As shown in FIG. 10, the comparator 23 may output the high frequency driving voltage HVsp when the 3D synchronizing signal 3D_sync is in the high level and may output the low frequency driving voltage LVsp when the 3D synchronizing signal 3D_sync is in the low level.

The panel controller 20 may further include a voltage amplifier 24 to amplify the high frequency driving voltage HVsp or the low frequency driving voltage LVsp from the comparator 23. The response speed of the liquid crystals may be improved by the high frequency driving voltage HVsp or the low frequency driving voltage LVsp, which is amplified by the voltage amplifier 24.

Figure 11:
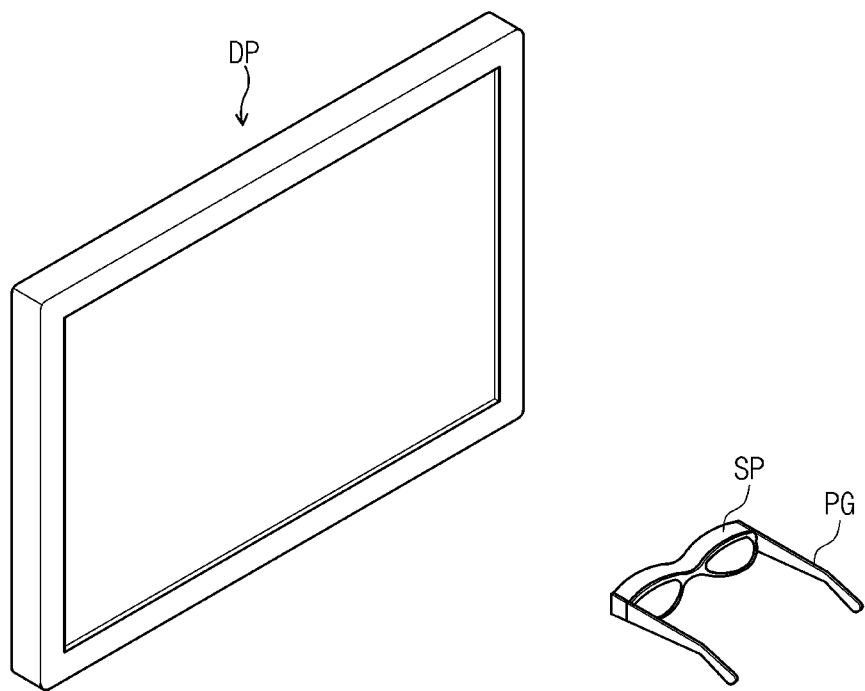
FIG. 11 is a perspective view showing a display apparatus according to exemplary embodiments of the present invention.
Figure 12:
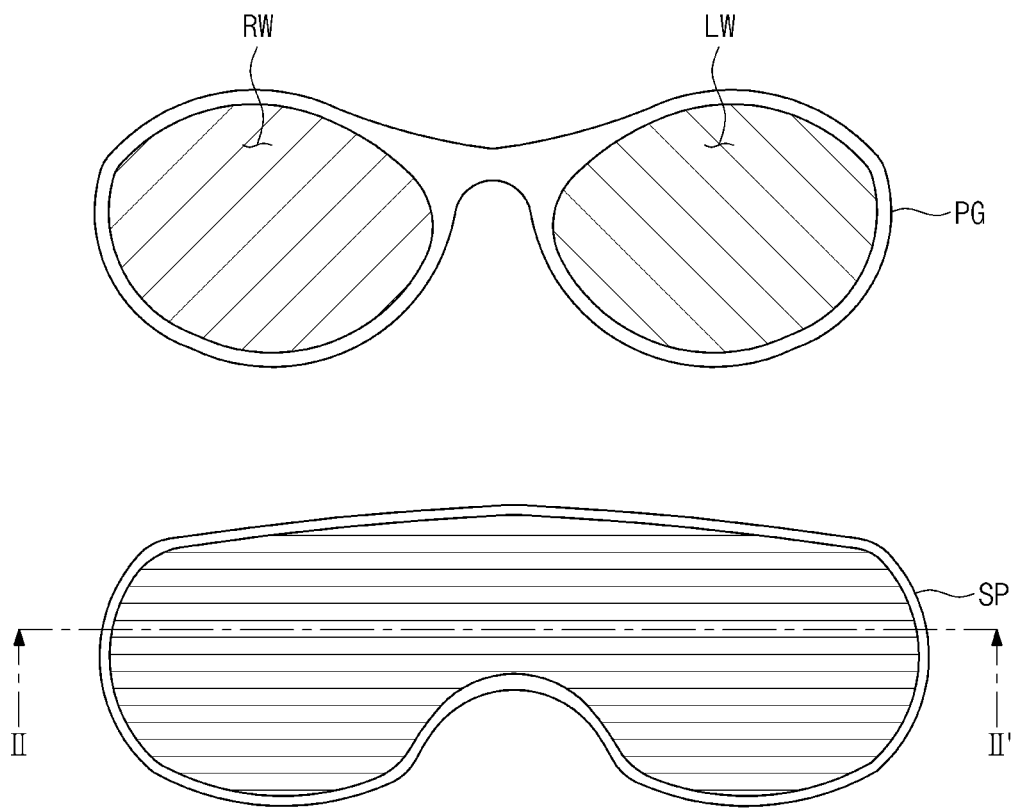
FIG. 12 is a view of the polarizing glasses shown in FIG. 11 according to exemplary embodiments of the present invention.
Figure 13:
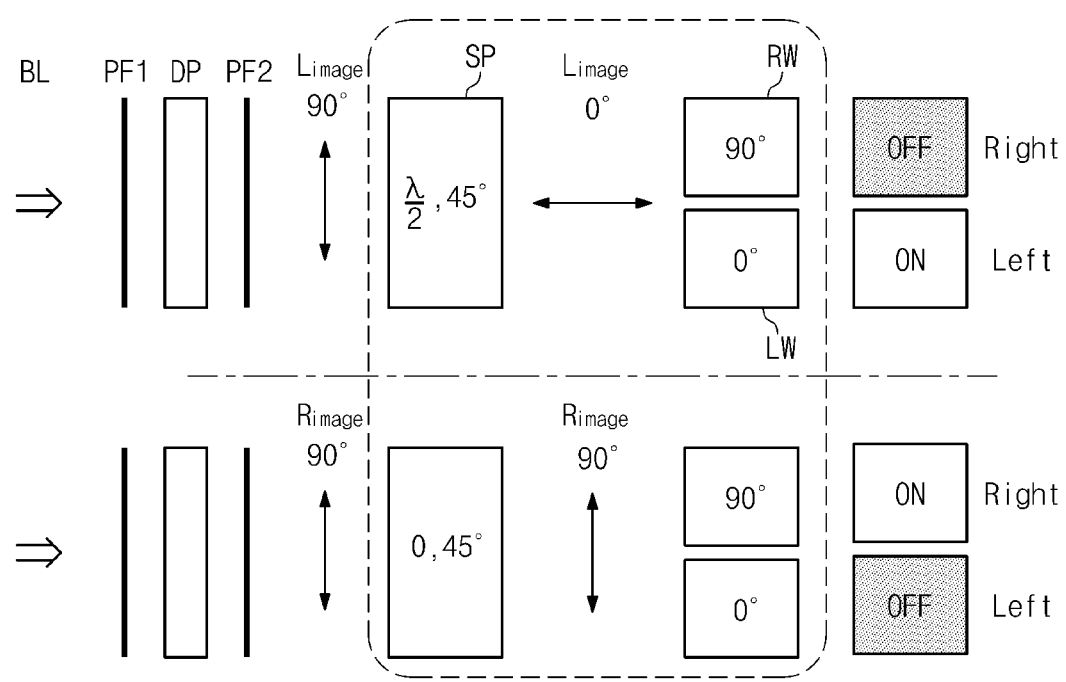
FIG. 13 is a view showing polarization directions of left-eye images and right-eye images displayed on the display panel shown in FIG. 11 according to exemplary embodiments of the present invention.

FIG. 11 is a perspective view showing a display apparatus according to exemplary embodiments of the present invention. FIG. 12 is a view showing the polarizing glasses of FIG. 11. FIG. 13 is a view showing polarization directions of left-eye and right-eye images displayed on a display panel shown in FIG. 11. In FIG. 11, FIG. 12, and FIG. 13, the same reference numerals denote the same elements in FIG. 1 to FIG. 10, and thus detailed descriptions of the same elements will be omitted.

In FIG. 11, the shutter panel SP is coupled with the polarizing glasses PG. The shutter panel SP may use the power source provided to the polarizing glasses PG as its driving voltage Vsp. The power source provided to the polarizing glasses PG may be any suitable is source including, for example, batteries or power provided from an electricity outlet via an electrical plug.

The panel part 10 has the same configuration as shown in FIG. 5, and the panel controller 20 has the same configuration as shown in FIG. 9.

Referring to FIG. 13, the left-eye image Limage may be polarized in a second direction while passing through the polarizing plates PF1 and PF2 in the display apparatus. The polarizing direction of the left-eye image Limage passing through the shutter panel SP may change to the direction of about zero degrees by a phase delay of about 90 degrees. The left-eye image Limage polarized in the direction of about zero degrees may transmit through the left window LW of the polarizing glasses PG and does not transmit through the right window RW. Accordingly, only the left eye of the viewer may view the left-eye image Limage.

As shown in FIG. 13, the right-eye image Rimage that passes through the polarizing plates PF1 and PF2 in the display apparatus may be polarized in the direction of about 90 degrees. Although the right-eye image Rimage passes through the shutter panel SP, the polarizing direction of the right-eye image Rimage may not change. The right-eye image Rimage polarized in the direction of about 90 degrees does not transmit through the left window LW of the polarizing glasses PG and may transmit through the right window RW. Thus, only the right eye of the viewer may view the right-eye image Rimage.

Consequently, although the shutter panel SP may be coupled with the polarizing glasses PG, the viewer may view the 3D image in the 3D mode.

In addition, as described with FIG. 4B, the display apparatus may further include the first $\lambda/4$ phase delay plate F1, the second $\lambda/4$ phase delay plate F2, and the third $\lambda/4$ phase delay plate F3.

The first $\lambda/4$ phase delay plate F1, the second $\lambda/4$ phase delay plate F2, and the third $\lambda/4$ phase delay plate F3 may be coupled with the polarizing glasses PG. The first $\lambda/4$ phase delay plate F1 may be disposed between the shutter panel SP and the polarizing glasses PG and may have the same shape as the shutter panel.

In addition, the second $\lambda/4$ phase delay plate F2 may be disposed between the shutter panel SP and the left window LW, and the third $\lambda/4$ phase delay plate F3 may be disposed between the shutter panel SP and the right window RW.

It should be understood that while a left-eye image Limage is disclosed hereinabove as being displayed before a right-eye image Rimage in one frame Ft, exemplary embodiments of the invention are not limited thereto. For example, without departing from the scope of the invention, in some cases, a right-eye image Rimage may be displayed before a left-eye image in one frame Ft.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A display system, comprising:
a shutter panel comprising dual-frequency liquid crystals; and
a display panel to display, alternately, a left-eye image and a right-eye image in a 3D mode, the left-eye image and the right-eye image passing through the dual-frequency liquid crystals,
wherein a polarity of dielectric constant anisotropy of the liquid crystals is changed according to a frequency of a driving voltage to selectively delay a phase of the left-eye image or a phase of the right-eye image, and wherein the left-eye image is polarized in a first direction, and the right-eye image is polarized in a second direction different from the first direction.

2. The display system of claim 1, wherein the shutter panel comprises:
 a panel part to delay one of the phase of the left-eye image and the phase of the right-eye image; and
 a panel controller to control the frequency of the driving voltage applied to the panel part.

3. The display system of claim 2, wherein the panel part comprises:
 a first substrate;
 a first electrode disposed on the first substrate;
 a second substrate facing the first substrate; and
 a second electrode disposed on the second substrate,
 wherein the dual-frequency liquid crystals are disposed between the first electrode and the second electrode.

4. The display system of claim 3, wherein the panel controller comprises:
 a high frequency voltage generator to generate a high frequency driving voltage;
 a low frequency voltage generator to generate a low frequency driving voltage; and
 a comparator to alternately output the high frequency driving voltage and the low frequency driving voltage based on a 3D synchronizing signal.

5. The display system of claim 4, wherein the panel controller further comprises:
 a voltage amplifier to amplify the high frequency driving voltage and the low frequency driving voltage and to provide the amplified high frequency driving voltage and the amplified low frequency driving voltage to the panel part.

6. The display system of claim 4, wherein the dual-frequency liquid crystals are arranged substantially parallel to the first electrode, the second electrode, or both the first electrode and the second electrode, in response to the high frequency driving voltage.

7. The display system of claim 6, wherein the dual-frequency liquid crystals are arranged substantially perpendicular to the first electrode, the second electrode, or both the first electrode and the second electrode, in response to the low frequency driving voltage.

8. The display system of claim 1, further comprising polarizing glasses, wherein the polarizing glasses comprise a left window having a first transmission axis to pass the left-eye image and a right window having a second transmission axis different from the first transmission axis to pass the right-eye image.

9. The display system of claim 8, wherein the shutter panel is coupled with and disposed on the display panel.

10. The display system of claim 8, wherein the shutter panel is coupled with and disposed on the polarizing glasses.

11. The display system of claim 1, further comprising a first $\lambda/4$ phase delay plate disposed on the shutter panel and having a first slow axis, wherein $\lambda$ is a wavelength.

12. The display system of claim 11, further comprising polarizing glasses, wherein the polarizing glasses comprise a left window to pass the left-eye image and a right window to pass the right-eye image, wherein the left window and the right window have the same transmission axis.

13. The display system of claim 12, further comprising:
 a second $\lambda/4$ phase delay plate disposed on one of the left window and the right window, the second $\lambda/4$ phase delay plate having the first slow axis; and
 a third $\lambda/4$ phase delay plate disposed on a remaining one of the left window and the right window and having a second slow axis different from the first slow axis.

14. The display system of claim 13, wherein the first slow axis is substantially perpendicular to the second slow axis.

15. The display system of claim 12, wherein the shutter panel is couple with and disposed on the display panel.

16. The display system of claim 12, wherein the shutter panel is coupled with and disposed on the polarizing glasses.

17. A display apparatus, comprising:
 a display panel to output a first image and a second image; and
 a shutter panel coupled to the display panel, the shutter panel comprising:
 a first electrode;
 a second electrode parallel to the first electrode; and
 a liquid crystal layer disposed between the first electrode and the second electrode, the liquid crystal layer comprising dual-frequency liquid crystals,
 wherein, in response to a high frequency voltage being applied to the first electrode and the second electrode, the dual-frequency liquid crystals align in a first direction relative to the first electrode, and the first image is phase delayed,
 wherein, in response to a low frequency voltage being applied to the first electrode and the second electrode, the dual-frequency liquid crystals align in a second direction relative to the first electrode, and the first image is not phase delayed, the second direction being perpendicular to the first direction, and
 wherein the first image is polarized in a first direction, and the second image is polarized in a second direction different from the first direction.

* * * * *